May 6, 1941.  B. W. KING  2,240,701
BEAM MEASURING INSTRUMENT
Filed Sept. 22, 1939  2 Sheets-Sheet 2
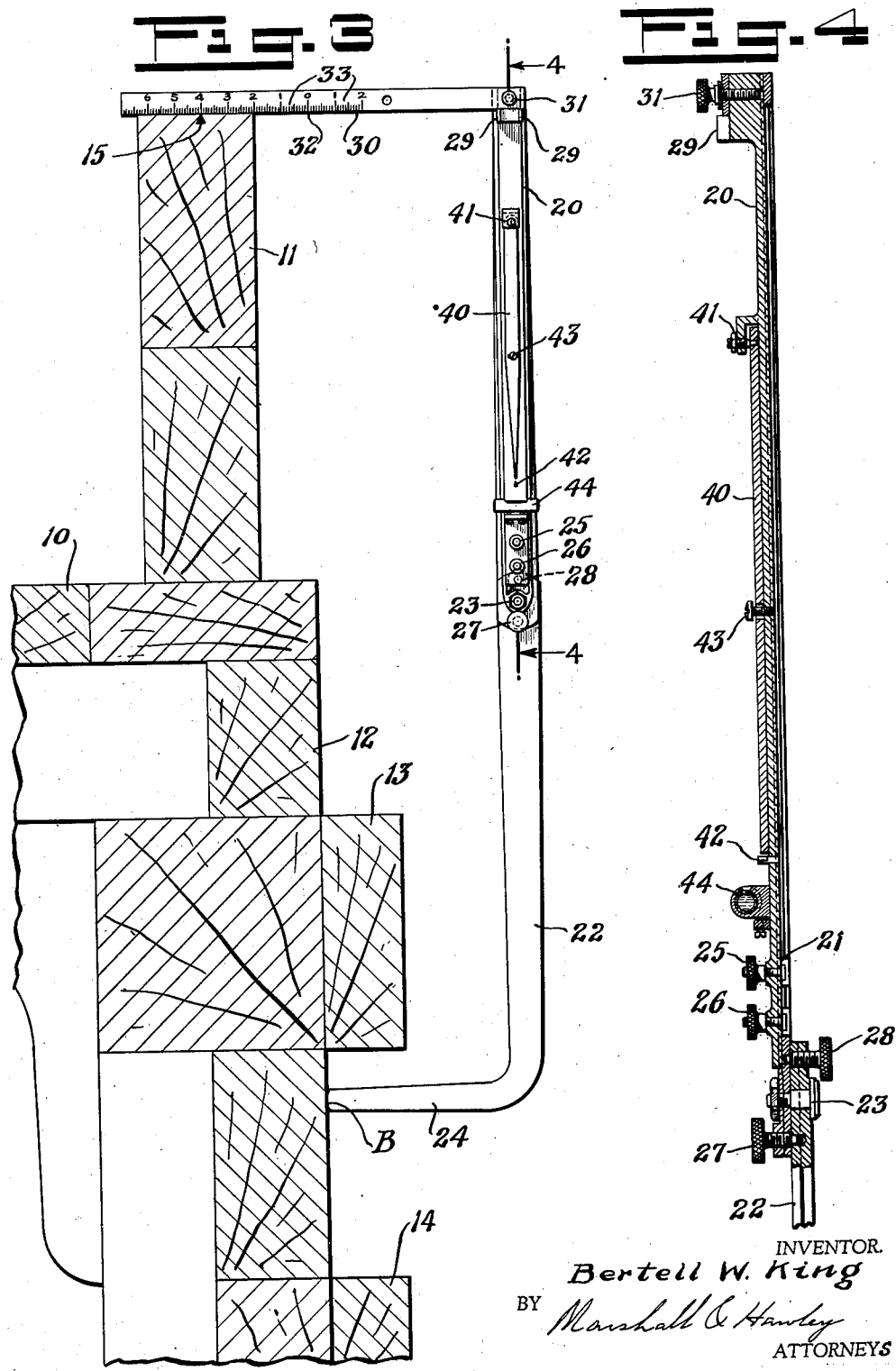
INVENTOR.
Bertell W. King
BY Marshall & Hawley
ATTORNEYS Patented May 6, 1941

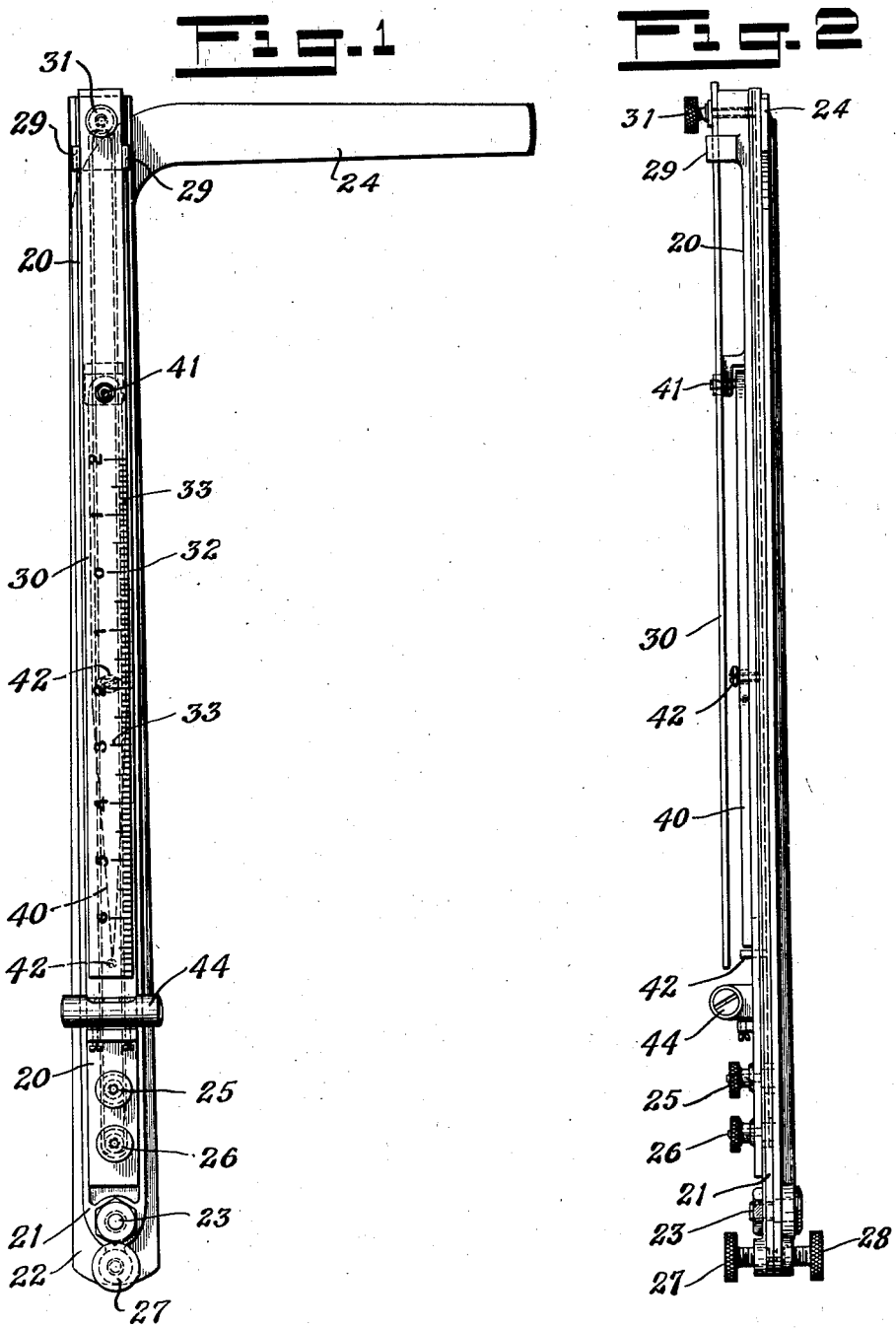

2,240,701

UNITED STATES PATENT OFFICE 2,240,701

BEAM MEASURING INSTRUMENT

Bertell W. King, Brooklyn, N. Y.

Application September 22, 1939, Serial No. 296,055

8 Claims. (Cl. 33—174)

This invention relates to improvements in beam measuring instruments and its object is to provide a simple and efficient device for measuring the beams of barges and other vessels.

Another object is to provide an instrument for measuring the distance between similar points on opposite sides of a vessel on different known levels on its sides. The instrument is made collapsible so that it occupies little room when not in use.

Figure 1 is a front elevation and Figure 2 is a side view of the instrument in its folded condition;

Figure 3 is a front elevation of the instrument unfolded and in use with parts of a barge which is being measured shown in sectional transverse section.

Figure 4 is a sectional side elevation on a larger scale of some of the parts shown in Figure 3, the section being taken on the line 4—4 of the latter figure.

10 designates a deck of a barge and 11 one of its cargo rails. 12 is a side of the barge and 13, 14 longitudinal beams which project laterally from the side. At a point indicated by the arrow at 15 a point is marked on the cargo rail 12 at a measured distance $a$ from a similar point on the opposite cargo rail and at such a position that a line through these points will be normal to the longitudinal center line of the barge.

The instrument illustrated as an embodiment of my invention comprises an elongated body 20, which forms a track for slidably supporting a member 21 near the lower end of which is connected bar 22 by a pivotal support 23. The other end of this bar extends at right angles to form an arm 24. 25, 26 are set screws arranged to maintain the member 21 in the desired longitudinally adjusted position relative to the body 20. 27, 28 are set screws arranged to hold the bar 22 in alinement with the body 20, either overlying the body as shown in Figures 1 and 2, or in a position to form an extension of the body, as shown in Figures 3 and 4.

30 is a bar supported by a threaded pivot 31 near the upper end of the body 20 and arranged, when the parts are folded, to lie between a pair of lugs 29, 29 on the body in a position parallel with the body and when the parts are unfolded, to be positioned by the lugs at right angles to the body and directly above the arm (see Figure 3). On the bar is a zero mark at 32 at a distance from the central axis of the body 20, equal to the distance of the end of arm 24 from the same axis. The rest of the bar from the zero mark to its free end is calibrated and on the other side of the zero mark, as at 33, preferably in feet and decimals of feet.

40 is a pendulum pivoted to body 20 at 41. Its lower end is pointed and directly below it a target point 42 projects from the center of the body 20. 43 is a screw mounted in the body 20 and extending through an arcuate slot in the pendulum to limit its swinging movement. Directly below the target point a level 44 is mounted on the body.

The instrument is used in the following manner: The parts are unfolded and the member 21 adjusted to bring the arm 24 into position to clear obstructions, such as the longitudinal beams 13, 14, so that the end of arm 24 may be brought into abutment with the side 12 of the vessel at the point B. This side generally is not vertical, as it is shown in Figure 3.

With the bar 30 resting on the cargo rail, the instrument is moved in or out until the body 20 and bar 22 are in a vertical position which can be determined by observing the position of the pendulum 40 and more accurately checked by the level 44. A measurement is then taken by observing the calibration mark 33 which coincides with the point at 15 on the cargo rail. A similar measurement is then taken on the other side of the vessel and the measurements thus taken are added to or subtracted from the distance $a$ to get the beam of the vessel at a level of the point B.

Another use for this instrument is for measuring the camber or the bow or stern curvature of a vessel. This is done by making three marks at an equal distance inwardly, as determined by the instrument from the same side of the vessel or from its bow or its stern. Then by measuring the distance of the central mark from a line drawn between the other marks the curve of the vessel between the outer marks may be computed.

Structural modifications may be made within the spirit and scope of this invention and I intend no limitations other than those imposed by the appended claims.

What I claim is:

1. A beam measuring instrument comprising a body, an arm extending laterally from said body having an end adapted to abut against a vessel, a calibrated bar near the upper end of the body extending laterally in the same direction therefrom, said bar having a zero point thereon and means for determining when said zero point is in vertical alinement with the end of said arm the calibrations on said bar being arranged to indicate the horizontal distance between the end of said arm and a fixed point on the vessel.

2. A beam measuring instrument comprising a body, an arm extending laterally from said body having an end adapted to abut against a vessel, a calibrated bar near the upper end of the body extending laterally in the same direction therefrom, said bar having a zero point thereon in vertical alinement with the end of said arm when the body is in a vertical position, and means for indicating when the body is in a vertical position the calibrations on said bar being arranged to indicate the horizontal distance between the end of said arm and a fixed point on the vessel.

3. A beam measuring instrument comprising a body, an arm extending laterally from said body having an end adapted to abut against a vessel, a calibrated bar near the upper end of the body extending laterally in the same direction therefrom, said bar having a zero point thereon in vertical alinement with the end of said arm when the body is in a vertical position, and means for indicating when the body is in a vertical position, said means comprising a level affixed transversely to the body the calibrations on said bar being arranged to indicate the horizontal distance between the end of said arm and a fixed point on the vessel.

4. A beam measuring instrument comprising a body, an arm extending laterally from said body having an end adapted to abut against a vessel, a calibrated bar near the upper end of the body extending laterally in the same direction therefrom, said bar having a zero point thereon in vertical alinement with the end of said arm when the body is in a vertical position, and means for indicating when the body is in a vertical position, said means comprising a pendulum pivotally attached to the body the calibrations on said bar being arranged to indicate the horizontal distance between the end of said arm and a fixed point on the vessel.

5. A beam measuring instrument comprising a body, a member adjustably attached to the body, the lower end of said member being offset to form an arm having an end adapted to abut against a vessel, a calibrated bar near the upper end of the body extending laterally therefrom, said bar having a zero point thereon in vertical alinement with the end of said arm when the body is in a vertical position, and means for indicating when the body is in a vertical position the calibrations on said bar being arranged to indicate the horizontal distance between the end of said arm and a fixed point on the vessel.

6. A collapsible beam measuring instrument comprising a body, a member slidably connected to the body, means for affixing said member to the body in different adjusted positions in alinement with the body, a pivotal connection between the body and said member, the end of the member opposite said pivotal connection being offset to form an arm having an end adapted to abut against a vessel, a calibrated bar pivoted to the body near the upper end thereof adapted to be moved into a position to extend inwardly therefrom at a desired fixed angle, said bar having a zero point thereon in vertical alinement with the end of said arm when the bar is extended and the body is in a vertical position, and means for indicating when the body is in vertical position the calibrations on said bar being arranged to indicate the horizontal distance between the end of said arm and a fixed point on the vessel.

7. A collapsible beam measuring instrument comprising a body, a member slidably connected to the body, means for affixing said member to the body in different adjusted positions in alinement with the body, a pivotal connection between the body and said member, the end of the member opposite said pivotal connection being offset to form an arm having an end adapted to abut against a vessel, a calibrated bar pivoted to the body near the upper end thereof adapted to be moved into a position to extend inwardly therefrom at a desired fixed angle, said bar having a zero point thereon in vertical alinement with the end of said arm when the bar is extended and the body is in a vertical position, and means for indicating when the body is in vertical position, said means comprising a level affixed transversely to the body the calibrations on said bar being arranged to indicate the horizontal distance between the end of said arm and a fixed point on the vessel.

8. A collapsible beam measuring instrument comprising a body, a member slidably connected to the body, means for affixing said member to the body in different adjusted positions in alinement with the body, a pivotal connection between the body and said member, the end of the member opposite said pivotal connection being offset to form an arm having an end adapted to abut against a vessel, a calibrated bar pivoted to the body near the upper end thereof adapted to be moved into a position to extend inwardly therefrom at a desired fixed angle, said bar having a zero point thereon in vertical alinement with the end of said arm when the bar is extended and the body is in a vertical position, and means for indicating when the body is in vertical position, said means comprising a pendulum pivotally attached to the body the calibrations on said bar being arranged to indicate the horizontal distance between the end of said arm and a fixed point on the vessel.

BERTELL W. KING.